US006848251B2

(12) United States Patent
(10) Patent No.: US 6,848,251 B2

Ripper et al.

(45) Date of Patent: Feb. 1, 2005

(54) DEVICE AND METHOD FOR PRODUCING A REDUCING AGENT AIR-MIXTURE

(75) Inventors: Wolfgang Ripper, Stuttgart (DE); Wilhelm Polach, Moeglingen (DE); Bernd Mahr, Plochingen (DE); Walter Frisch, Stuttgart (DE); Sven Huber, Freilassing (DE); Hanspeter Mayer, Adnet (AT); Michael Offenhuber, Adnet (AT); Markus Foetschl, Unternberg (AT); Gerald Hoepflinger, Puch (AT)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 10/168,015

(22) PCT Filed: Dec. 14, 2000

(86) PCT No.: PCT/DE00/04473

§ 371 (c)(1), (2), (4) Date: Nov. 14, 2002

(87) PCT Pub. No.: WO01/45827

PCT Pub. Date: Jun. 28, 2001

(65) Prior Publication Data

US 2003/0145580 A1 Aug. 7, 2003

(30) Foreign Application Priority Data

Dec. 22, 1999 (DE) ........................................ 199 61 947

(51) Int. Cl.[7] .................................................. F01N 3/00

(52) U.S. Cl. ............................. 60/286; 60/274; 60/295

(58) Field of Search .......................... 60/274, 286, 295, 60/303; 222/145.6, 145.5; 239/416.4, 416.5, 418, 423, 424

(56) References Cited

U.S. PATENT DOCUMENTS

| | | | | | |
|---|---|---|---|---|---|
| 3,630,024 | A | * | 12/1971 | Hopkins | 60/742 |
| 3,831,854 | A | * | 8/1974 | Sato et al. | 239/406 |
| 5,567,141 | A | * | 10/1996 | Joshi et al. | 431/8 |
| 5,617,997 | A | * | 4/1997 | Kobayashi et al. | 239/8 |
| 6,192,677 | B1 | * | 2/2001 | Tost | 60/286 |
| 6,526,746 | B1 | * | 3/2003 | Wu | 60/286 |
| 6,539,708 | B1 | * | 4/2003 | Hofmann et al. | 60/286 |

FOREIGN PATENT DOCUMENTS

JP P 54-77318 * 6/1979

* cited by examiner

*Primary Examiner*—Thomas Denion
*Assistant Examiner*—Tu M. Nguyen
(74) *Attorney, Agent, or Firm*—Ronald E. Greigg

(57) ABSTRACT

A device for generating a mixture of reducing agent and air, having a mixing space into which reducing agent via a reducing agent delivery conduit and air via an air delivery conduit can be introduced into the mixing space, having means for pressurizing the air, in such a way that the air flows essentially at the speed of sound through the air delivery conduit.

17 Claims, 4 Drawing Sheets

FIG. 2
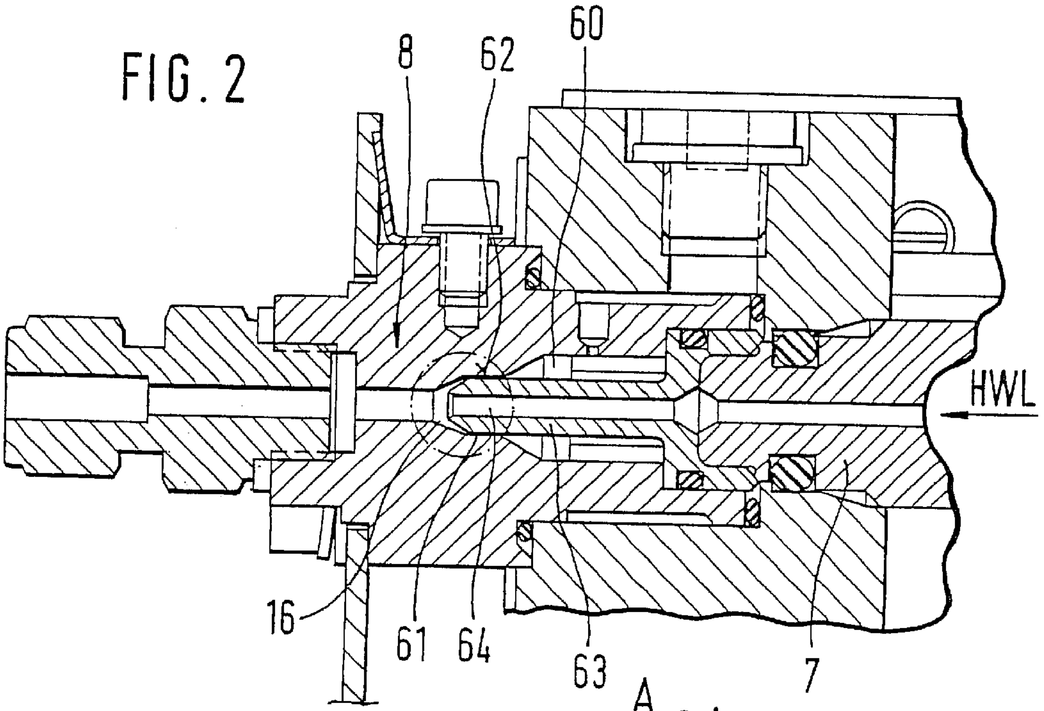
FIG. 3
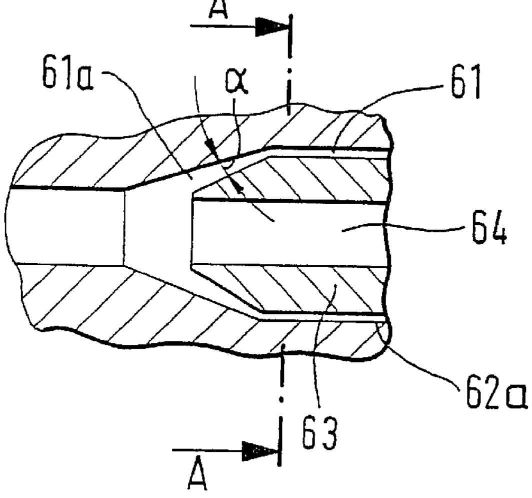
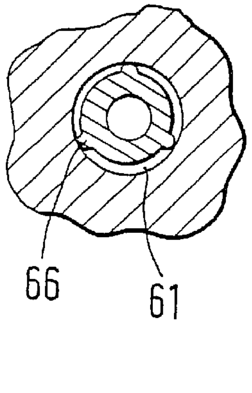
FIG. 4

FIG. 5
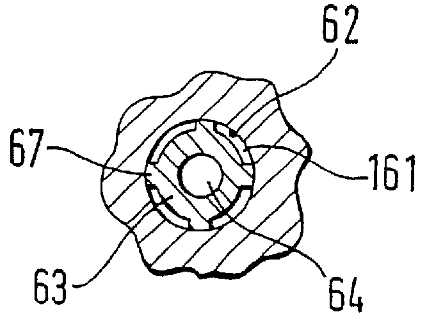
FIG. 6
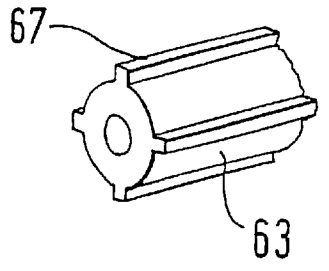
FIG. 7b
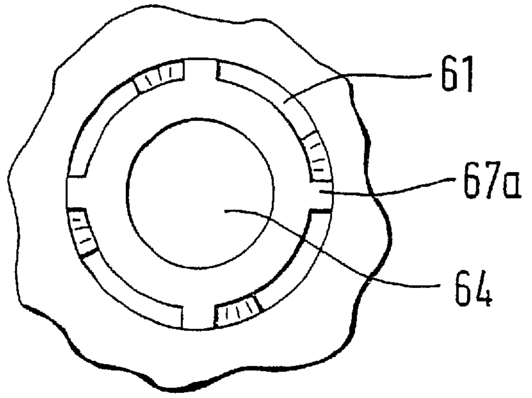
FIG. 7a
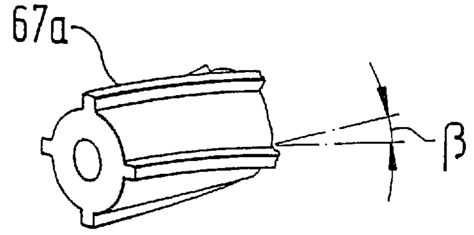
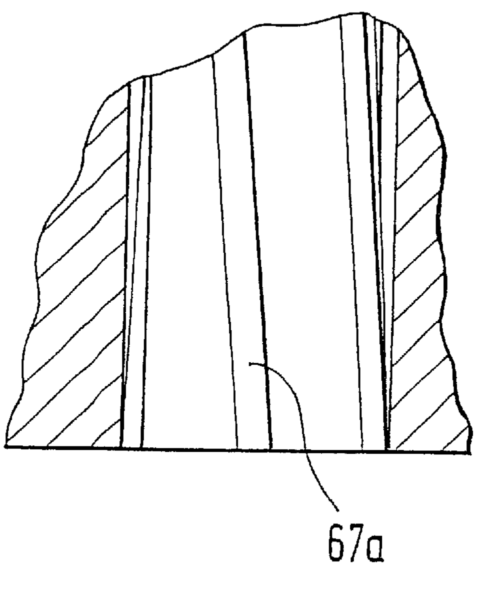
FIG. 7c FIG. 8a
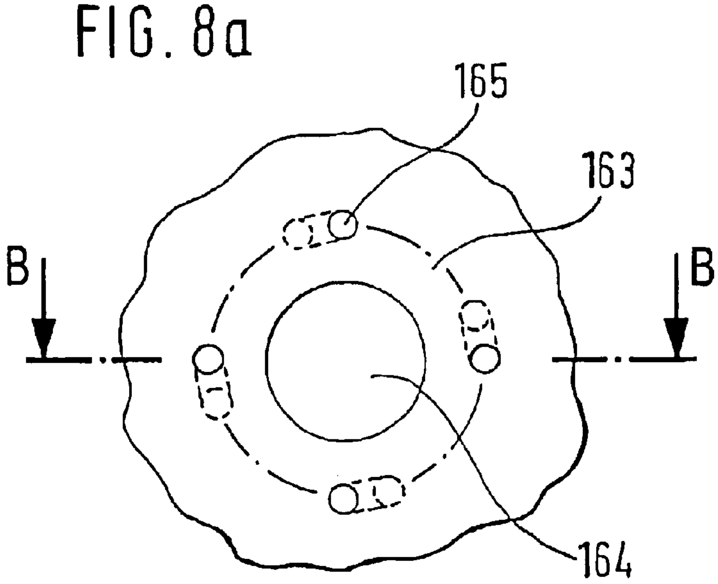
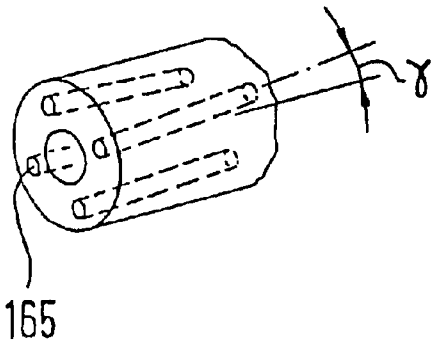
FIG. 8b
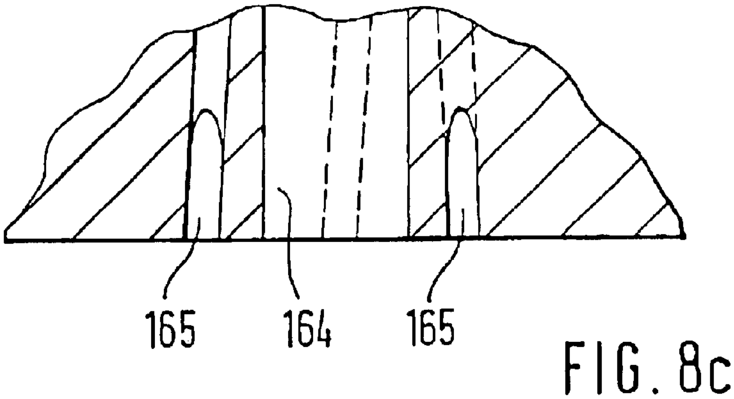
FIG. 8c

DEVICE AND METHOD FOR PRODUCING A REDUCING AGENT AIR-MIXTURE

CROSS-REFERENCE TO RELATED APPLICATIONS

This application is a 35 U.S.C. 371 application of PCT/DE 00/04473, filed on Dec. 14, 2000.

BACKGROUND OF THE INVENTION

1. Field of the Invention

The present invention relates to a device and a method for generating a mixture of reducing agent and air and more particularly to such devices and methods used for posttreating internal combustion engine exhaust senses.

2. Description of the Prior Art

Because pollutant limit values have been set lower and lower in recent years, numerous devices and methods for posttreating exhaust gases in internal combustion engines have been developed. For example, by means of catalytic converter systems that use urea and/or ammonia as a reducing agent for $NO_x$ conversion, efficient exhaust gas posttreatments have been made available.

To achieve a reduction in $NO_x$ ingredients in exhaust gases, reduction catalytic converters have been developed especially for Diesel engines. A distinction is typically made between so-called SCR (Selective Catalytic Reduction) catalytic converters with urea metering systems and storage-type catalytic converters. The SCR catalytic converters are regenerated by means of a delivery of urea and/or ammonia reducing agent, while the storage catalytic converters are regenerated with hydrocarbons from the entrained engine fuel, in so-called rich exhaust gas phases.

From European Patent Disclosure EP-A 0 381 236, a system is known which, to remove nitrogen oxides from exhaust gases from a Diesel engine, meters in ammonia as a reducing agent. Also provided in this system is a turbocharger, which reduces the pressure of the exhaust gas. A urea-water solution employed is metered in by means of compressed air.

From German Patent Disclosure DE-A 44 41 261, a device for posttreating the exhaust gases of an internal combustion engine is known in which the catalytic converter capacity is meant to be improved via a metering device. The metering device is embodied as an electromagnetic metering valve, which moves (opens and closes) at the same clock frequency. The metering quantity is defined by the pulse-width repetition rate upon each stroke (and by the pressure difference). Adding the reducing agent to the exhaust gas system is preferably done as a function of a performance graph, that is, of the quantity and/or composition of the exhaust gas.

From German Patent Disclosure DE 42 30 056 A1, it is known to generate an aerosol on the basis of a reducing agent and compressed air acting upon it in a mixing chamber. The reducing agent and the air are delivered to the mixing chamber via separate lines. During one metering event, pressure fluctuations and turbulence can occur in the mixing chamber, which can cause a reverse flow of reducing agent, for instance an aqueous urea solution, into the compressed air line. During the metering operation, fluctuations in the volumetric flow of air can also occur. For instance, the volumetric flow of air drops with an increasing injection quantity of reducing agent into the mixing chamber. A dropping volumetric flow has an adverse effect, however, on the mixing together of reducing agent and air, as well as on the transporting of the reducing agent to the point of its injection into an exhaust system. If a urea-water solution is used, an undesired crystallization of urea from the solution can also occur in the line system.

OBJECTS AND SUMMARY OF THE INVENTION

The primary object of the invention is to improve preparation of a mixture of reducing agent and air such that fluctuations in the volumetric air flow have no adverse effects on a mixture of reducing agent and air that is generated.

By the provision according to the invention of conducting the air acting on the reducing agent through the air delivery conduit at a supercritical pressure difference or the speed of sound, the air quantity flowing into a mixing chamber can be selected in certain pressure regions to be constant, independently of a pressure prevailing in the mixing space, if the incident pressure difference is greater than the critical pressure difference of the throttle for the prevailing conditions (temperature etc.). The high flow velocity also reduces out-crystallization of urea, for instance, or keeps it in a stable state. It proves to be especially reliable that an undesired reverse flow of reducing agent into the air delivery conduit is effectively suppressed. Moreover, the air stream flowing at high velocity acts as a spray and assures effective action on the reducing agent and in particular a very uniform wall film development.

To assure the provision according to the invention that the air flows through the air delivery conduit at the speed of sound, the air delivery conduit is embodied such that the pressure difference at the air delivery conduit is supercritical.

In one preferred embodiment of the device of the invention, the reducing agent delivery conduit is embodied as a nozzle disposed in a mixing chamber housing bore, and the air delivery conduit is embodied as an annular gap, concentrically surrounding the nozzle, between the nozzle and the wall of the mixing chamber housing bore. This concentric embodiment of the air delivery and reducing agent delivery has a small structure and proves to be sturdy and reliable in practice.

Expediently, an end portion of the annular gap, which portion discharges into the mixing space, is embodied as widening in the flow direction of the air. This provision, in the end portion of the annular gap, causes the inflowing air to slow down, which has a favorable effect on the mixing of the air with the reducing agent. Widening the end portion in this way can reduce turbulence in the mixing of reducing agent and air and prevent out-crystallization.

It is preferable that the end portion is embodied as widening uniformly, forming a mixing space/nozzle angle between the wall and the nozzle of from 10° to 30°. Such dimensions assure especially slight turbulence.

In a preferred feature of the device of the invention, it has retention means for retaining the nozzle in the mixing chamber housing bore. With such retention means, precise positioning of the nozzle inside the mixing chamber housing bore is attainable.

Expediently, the retention means have centering bumps, by means of which centering of the nozzle in the mixing chamber bore can be achieved in a simple way.

In a further preferred embodiment of the retention means, they have support ribs. As a result of this provision, the annular gap nozzle can be subdivided into separate nozzle fields between the individual support ribs. This enables especially good guidance of the air stream and simultaneously precise centering of the reducing agent nozzle.

In a preferred embodiment of the support ribs, they are embodied in radiating or helical form. As a result, a swirling motion can be forced on the flowing air. An air swirl thus created improves the mixing together of the air with the reducing agent.

In a further preferred embodiment of the device of the invention, the air delivery conduit has at least one bore embodied in a housing of a nozzle wall containing the reducing agent delivery conduit. Such a bore can be dimensioned in a simple way, to make a desired imposition of pressure attainable in order to assure the speed of sound of the flowing air.

Expediently, the at least one bore is embodied at least partly in radiating or helical form. By means of this provision, the aforementioned imposition of a swirl on the flowing air is attainable.

BRIEF DESCRIPTION OF THE DRAWINGS

The invention will be described more fully herein below, with reference to the individual drawings, in which:

FIG. 2, a side view of a preferred embodiment of the device of the invention;

FIG. 3, an enlarged view of the region marked with a circle in FIG. 2;

FIG. 4, a fragmentary section taken along the line A—A of FIG. 3;

FIG. 5, a fragmentary sectional view corresponding to FIG. 4 of a further preferred embodiment of the device of the invention;

FIG. 6, a perspective view of the device of FIG. 5;

FIG. 7*a*, a perspective view corresponding to FIG. 6 of a further preferred embodiment of the device of the invention;

FIG. 7*b*, a fragmentary sectional view, corresponding to FIG. 4 or 5, of the embodiment of FIG. 7*a;*

FIG. 7*c*, a further view of the embodiment of FIG. 7*a;*

FIG. 8*a*, a fragmentary sectional view, corresponding to FIG. 4 or 5, of a further preferred embodiment of the device of the invention;

FIG. 8*b*, a perspective view of the device of FIG. 8*a*; and

FIG. 8*c*, a further view of the embodiment of FIGS. 8*a*, 8*b* taken along the section line B—B of FIG. 8*a*.

DESCRIPTION OF THE PREFERRED EMBODIMENTS

Figure 1:
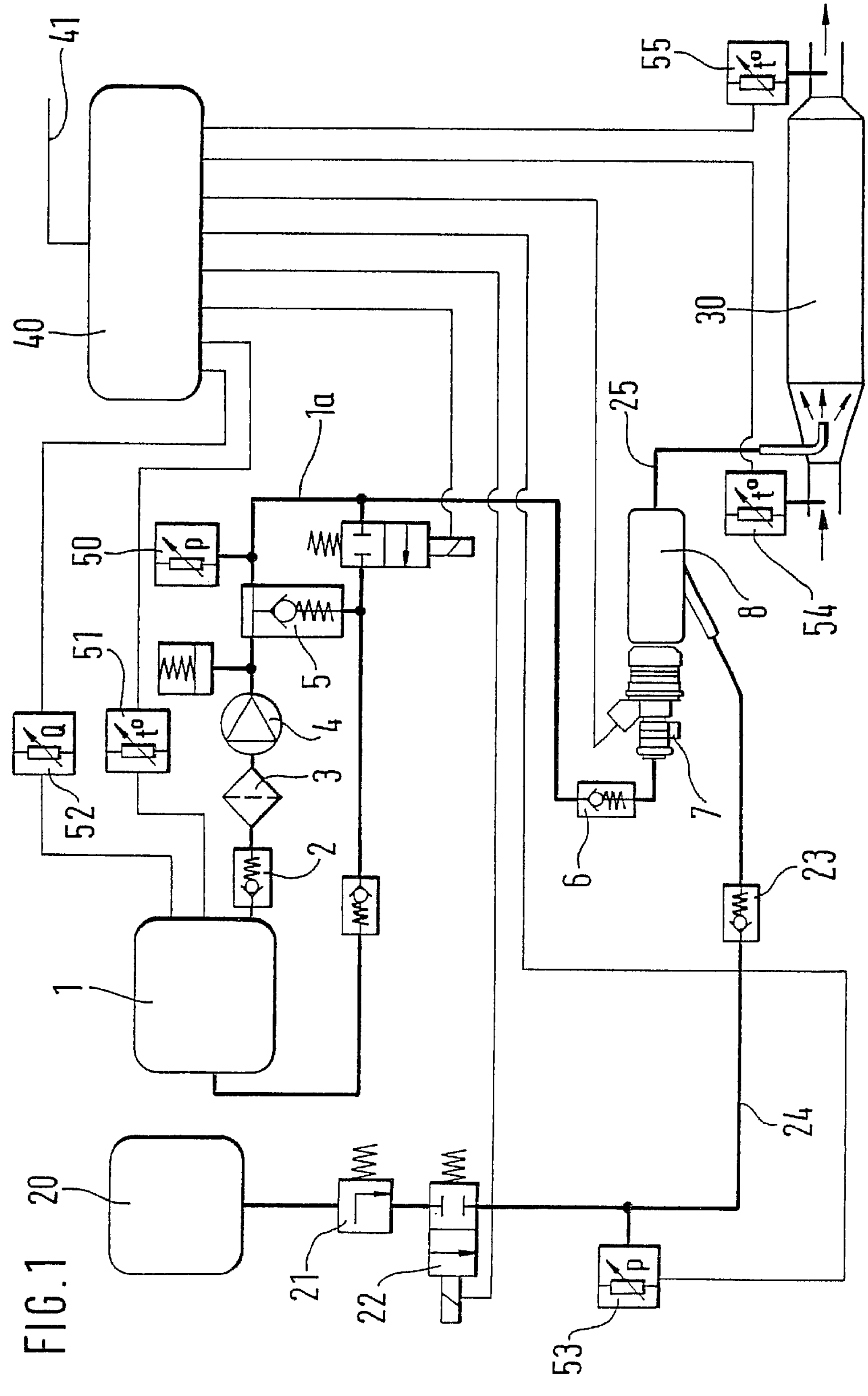
FIG. 1, a block circuit diagram showing a urea metering system in which the device and method of the invention can advantageously be employed.

In FIG. 1, reference numeral 1 indicates a urea tank, from which urea-water solution is aspirated, via a line la with a check valve 2 and with a filter 3 embodied as a filter screen, by a feed pump 4 and pumped via a further check valve 6 to a metering valve 7 via a mixing chamber 8. The metering valve 7 meters the requisite quantity of urea-water solution into a mixing space or diffusor, which is designated by reference numeral 16 in FIG. 2. Any overflow quantity of urea and water that may occur can be returned to the urea tank 1 via a pressure regulator.

Reference numeral 20 also indicates a compressed air container, from which compressed air can be introduced into the mixing chamber 8 via a compressed air line 24 with a pressure limiter 21, a 2/2-way valve 22 and a check valve 23. The check valve 23 prevents a reverse flow of a mixture of reducing agent and air out of the mixing chamber into the compressed air line 24.

In the mixing chamber 8, with subjection of the urea-water solution to the compressed air, an aerosol is created, which is introduced via an aerosol line 25 into a catalytic converter 30. A control unit 40 acquires signals, which are received from a higher-ranking engine control unit via a CAN data line 41, along with the signals of pressure, temperature and fill level sensors 50 through 55, whose function is known per se and will not be explained further here. From this information, the control unit 40 calculates a metering quantity of urea that is to be added to the exhaust gas flowing through the catalytic converter 30.

Turning to FIGS. 2 and 3, a first preferred embodiment of the device of the invention, which forms a part of the mixing chamber 8, will now be described.

The compressed air introduced into the mixing chamber via the compressed air line 24 passes via an annular chamber 60 into an annular gap 61, which is defined between the wall 62*a* of a mixing chamber bore 62 and a nozzle 63 disposed concentrically in the bore. The nozzle 63 is embodied with a bore 64 in its center, by way of which urea-water solution can be injected into the mixing space 16. The air flowing through the annular gap 61 is also introduced into the mixing space 16. An air pressure $P_1$ prevails in the annular chamber 60, and an air pressure $P_2$ prevails in the mixing space 16. According to the invention, the annular gap 61 and the mixing space 16 are dimensioned in such a way, and the air delivery system 20, 21, 22, 23, 24 is embodied such, that the air flows through the annular gap 61 at the speed of sound; that is, the pressure difference $\Delta P = P_1 - P_2$ is supercritical. As an example, for a pressure difference $\Delta P$ of greater than 1.5 bar, a cross-sectional area of approximately 0.6 $mm^2$ can be selected for the annular gap 61. Under such flow conditions, the air flow emerging from the annular gap 61 is defined by the specified gap cross section. In certain pressure regions, the air quantity flowing through the annular gap 61 can thus be kept constant, independently of the inlet pressure, that is, the pressure $P_2$ prevailing in the mixing space. Because of the high flow speed, out-crystallization of urea is also reduced or kept in a stable state. The reverse flow of urea-water solution through the annular gap into the air side of the system is also effectively suppressed.

Particularly from FIG. 3, it can be seen that the annular gap 61 is embodied with an end portion 61*a* that widens uniformly. An angle $\alpha$ can be seen, embodied between the wall 62 and the nozzle 63 and amounting preferably to from 10° to 30°. By a suitable choice of this so-called diffusor/nozzle angle, the turbulence in the mixing together of urea-water solution and air can be reduced, and the out-crystallization of urea can be lessened.

For exact concentric disposition of the nozzle 63 relative to the mixing chamber bore wall 62, the nozzle 63 can be embodied with centering bumps 66, as shown in the sectional view of FIG. 4.

In FIGS. 5 and 6, a further preferred embodiment of the device of the invention is shown. It can be seen that here the centering bumps acting as retention means are replaced by support ribs 67. These support ribs are joined integrally to the wall of the nozzle 63. The nozzle 63 is braced here by means of the support ribs 67 in the mixing chamber bore 62. The annular gap is thus subdivided into individual nozzle fields 161 between the individual ribs. This provision makes it possible to guide the air stream in a favorable way and simultaneously to assure precise centering of the nozzle 63. The support ribs can also be disposed in radiating or helical form on the housing of the nozzle 63, as shown schematically in FIG. 7*a*. The support ribs, there identified by reference numeral 67*a*, have an angle β relative to the longitudinal direction of the nozzle. As a result of this provision, a swirling motion can be imposed on the flowing air, favorably affecting the mixing of the air with urea-water solution. A view corresponding to FIG. 5 of this embodiment is shown in FIG. 7*b*. It should be noted that the support ribs 67*a* can be embodied as helical ribs. Another view (plan view) of this embodiment is shown in FIG. 7*b*. The oblique course of the support ribs 67*a* relative to the substantially tubular length of the nozzle can be seen especially well here.

Finally, turning to FIGS. 8*a*, 8*b* and 8*c*, a further preferred embodiment of the device of the invention is shown. Here, a nozzle embodied with a central urea-water solution inlet 164 is identified overall by reference numeral 163. The air is introduced into a mixing space not via an annular gap, of the kind provided in the embodiments described above, but via bores 165, which are provided concentrically surrounding the inlet 164 in the housing of the nozzle. In this embodiment as well, the air lines 165 can have an angle relative to the main longitudinal direction of the nozzle, or the direction of the urea-water solution inlet 164, and this angle is identified schematically as γ in FIG. 8*b*. This provision again makes it possible to create a swirling motion of the flowing air. By the provision that the air be conducted into the mixing space via such bores 165, it is also easily possible to make an air flow that flows at the speed of sound available. The diameter of the bores 165 here is selected such that at a supercritical pressure difference, a flow of the air at the speed of sound can be brought about.

The foregoing relates to preferred exemplary embodiments of the invention, it being understood that other variants and embodiments thereof are possible within the spirit and scope of the invention, the latter being defined by the appended claims.

We claim:

1. In a device for generating a mixture of reducing agent and air for catalytically removing nitrogen from exhaust gases of internal combustion engines, having a mixing space (16) into which reducing agent can be introduced via a reducing agent delivery conduit (64, 164) and air can be introduced via an air delivery conduit (61, 165), the improvement comprising means (20, 21, 22, 23, 24, 60, 61, 165) for pressurizing the air whereby the air that acts on the reducing agent is carried with a supercritical pressure difference through the air delivery conduit, and the air quantity flowing into the mixing chamber can be kept constant in certain pressure regions, independently of a pressure prevailing in the mixing space, the mixing space being embodied as a space separate from the arrangement carrying the exhaust gases, and the mixture of reducing agent and air can be transported from the mixing chamber to a catalytic converter (30) via a line (25) communicating with the mixing space, the reducing agent delivery conduit (64, 164) being embodied as a nozzle (63) disposed in a mixing chamber housing bore (62), and the air delivery conduit being embodied as an annular gap (61), concentrically surrounding the nozzle (63), between the nozzle and the wall (62*a*) of the mixing chamber housing bore (62), and an end portion (61*a*) of the annular gap (61), which portion discharges into the mixing space (16), being embodied as widening in the flow direction of the air.

2. The device of claim 1 wherein the air delivery conduit has at least one bore (165) embodied in a housing a nozzle wall containing the reducing agent delivery conduit (164).

3. The device of claim 1 wherein the end portion (61*a*) is embodied as widening uniformly, forming a mixing space/nozzle angle (α) between the wall and the nozzle of from 10° to 30°.

4. The device of claim 3 further comprising retention means for retaining the nozzle in the mixing chamber housing bore.

5. The device of claim 4 wherein the retention means have support ribs (67).

6. The device of claim 5 wherein the support ribs (67) are embodied in radiating or helical form.

7. The device of claim 4 wherein the retention means have centering bumps (66).

8. The device of claim 7 wherein the retention means have support ribs (67).

9. The device of claim 8 wherein the support ribs (67) are embodied in radiating or helical form.

10. The device of claim 1 further comprising retention means for retaining the nozzle in the mixing chamber housing bore.

11. The device of claim 10 wherein the retention means have centering bumps (66).

12. The device of claim 11 wherein the retention means have support ribs (67).

13. The device of claim 12 wherein the support ribs (67) are embodied in radiating or helical form.

14. The device of claim 10 wherein the retention means have support ribs (67).

15. The device of claim 14 wherein the support ribs (67) are embodied in radiating or helical form.

16. The device of claim 14 wherein the at least one bore (165) is embodied at least partially in radiating or helical form.

17. A method for generation a mixture of reducing agent and air for catalytically removing nitrogen from exhaust gases of internal combustion engines, in which a mixing space (16) is used, into which reducing agent via a reducing agent delivery conduit (64, 164) and air via and air delivery conduit (61, 165) are introduced, the mthod comprising acting upon the air in such a way that the air that acts on the reducing agent is carried with a supercritical pressure difference through the air delivery conduit, and the air quantity flowing into the mixing chamber can be kept constant in certain pressure regions, independently of a pressure prevailing in the mixing space, embodying the mixing space as a space separate from the arrangement carrying the exhaust gases, transporting the mixture of reducing agent and air from the mixing chamber to a catalytic converter (30) via a line (25) communicating with the mixing space, embodying the reducing agent delivery conduit (64, 164) as a nozzle (63) disposed in a mixing chamber housing bore (62), embodying the air delivery conduit as an annular gap (61), concentrically surrounding the nozzle (63), between the nozzle and the wall (62*a*) of the mixing chamber housing bore (62), and embodying an end portion (61*a*) of the annular gap (61), which portion discharges into the mixing space (16), as widening in the flow direction of the air.

* * * * *

UNITED STATES PATENT AND TRADEMARK OFFICE

CERTIFICATE OF CORRECTION

PATENT NO. : 6,848,251 B2 
DATED : February 1, 2005
INVENTOR(S) : Wolfgang Ripper et al.

It is certified that error appears in the above-identified patent and that said Letters Patent is hereby corrected as shown below:

Title page,
Item [75], should read as follows:
-- [75] Inventors: Wolfgang Ripper, Stuttgart (DE); Wilhelm Polach, Moeglingen (DE); Bernd Mahr, Plochingen (DE); Walter Frisch, Ditzingen (DE); Sven Huber, Anning (DE); Hanspeter Mayer, Adnet (AT); Michael Offenhuber, Adnet (AT); Markus Foetschl, Unternberg (AT); Gerald Hoepflinger, Puch (AT) --

Signed and Sealed this

Twenty-eighth Day of June, 2005

JON W. DUDAS
*Director of the United States Patent and Trademark Office*